US012612505B2

(12) United States Patent (10) Patent No.: US 12,612,505 B2

Saito et al. (45) Date of Patent: Apr. 28, 2026

(54) MOLDED BODY FOR HOUSING, RESIN COMPOSITION FOR USE IN FORMING SAME, AND MASTERBATCH

(71) Applicants: artience Co. Ltd., Tokyo (JP); TOYOCOLOR CO., LTD., Tokyo (JP)

(72) Inventors: Moe Saito, Tokyo (JP); Yuki Majima, Tokyo (JP); Makoto Yanagisawa, Tokyo (JP); Keisuke Masuda, Tokyo (JP)

(73) Assignees: artience Co. Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 216 days.

(21) Appl. No.: 18/563,917

(22) PCT Filed: May 23, 2022

(86) PCT No.: PCT/JP2022/021069

§ 371 (c)(1),
(2) Date: Nov. 24, 2023

(87) PCT Pub. No.: WO2023/276489

PCT Pub. Date: Jan. 5, 2023

(65) Prior Publication Data

US 2025/0084231 A1 Mar. 13, 2025

(30) Foreign Application Priority Data

Jul. 1, 2021 (JP) ................................. 2021-109787

(51) Int. Cl.
*B32B 9/00* (2006.01)
*C08K 3/04* (2006.01)

(52) U.S. Cl.
CPC ................................... *C08K 3/041* (2017.05)

(58) Field of Classification Search
CPC .............................. C08K 3/041; Y10T 428/30
USPC .......................................................... 428/408
See application file for complete search history.

(56) References Cited

U.S. PATENT DOCUMENTS

2016/0355670 A1 12/2016 Lee et al.
2017/0066907 A1 3/2017 Choi et al.

FOREIGN PATENT DOCUMENTS

| JP | 2016504471 | 2/2016 |
| JP | 2016108524 | 6/2016 |
| JP | 2017512847 | 5/2017 |

OTHER PUBLICATIONS

"International Search Report (Form PCT/ISA/210) of PCT/JP2022/021069", mailed on Jul. 26, 2022, with English translation thereof, pp. 1-6.

*Primary Examiner* — Daniel H Miller
(74) *Attorney, Agent, or Firm* — JCIPRNET

(57) ABSTRACT

The purpose of the present invention is to provide a molded body that is for use as a housing and transmits electromagnetic waves such as millimeter waves but is still very dark black, a resin composition that is for use in forming the molded body for a housing and has favorable molding fluidity, and a masterbatch. This molded body for a housing is formed from a resin composition that includes a thermoplastic resin (A) and carbon nanotubes (B). The carbon nanotubes (B) have a specific surface oxygen concentration, diffraction peak half width, and Raman spectrum G/D ratio, the molded body includes 0.10-2 parts by mass of the carbon nanotubes (B) per 100 parts by mass of the thermoplastic resin (A), and the surface resistivity of the molded body is at least $1.0 \times 10^{11} \Omega/\square$.

5 Claims, No Drawings

MOLDED BODY FOR HOUSING, RESIN COMPOSITION FOR USE IN FORMING SAME, AND MASTERBATCH

CROSS-REFERENCE TO RELATED APPLICATION

This application is a 371 application of the International PCT application serial no. PCT/JP2022/021069, filed on May 23, 2022, which claims the priority benefits of the Japanese Patent application serial no. 2021-109787, filed on Jul. 1, 2021. The entirety of each of the above-mentioned patent applications is hereby incorporated by reference herein and made a part of this specification.

TECHNICAL FIELD

The present disclosure relates to a molded body for a housing, a resin composition for use in forming the same, and a masterbatch.

BACKGROUND ART

Resin molded bodies are in use in a wide range of fields such as electrical or electronic device parts, auto parts, medical parts and food containers since molding is easy. In these fields, studies are underway to use resin molded bodies imparted with functionality or decorativeness in housings such as the cases of smartphones or personal computers and the external panels of automobiles or airplanes.

For example, in the automotive field, not only durability for protecting vehicle bodies but a variety of mechanical properties are also required, and there is a demand from designers or consumers for imparting high designability. Improvement in designability imparting a luxurious feeling is particularly required, and there is an increasing demand for a bluish and highly black tone, so-called very dark black, as means for imparting a luxurious feeling. Ordinarily, at the time of coloring resins to black, there are cases where, aside from a black pigment such as carbon black or perylene black, a black dye such as an azo-based compound or an azine-based compound is used. In the case of using a polypropylene resin or the like as a base material resin, since there are cases where a black dye bleeds, it is ordinary to use carbon black having no concern of bleeding.

The tone of a molded body for which carbon black is used tends to vary with the primary particle diameters of the carbon black. As the particle diameters become smaller, the blackness becomes higher and a reddish tinge becomes stronger, and, as the particle diameters become larger, a bluish tinge is exhibited. That is, the bluish tinge and blackness of carbon black have a trade-off relationship in the case of being based on particle diameters. Therefore, it has been difficult to manufacture resin molded bodies having a bluish and highly black, so-called dark black tone using carbon black and resin compositions that serve as a raw material for forming the resin molded bodies.

As means for solving these problems, studies are underway to use carbon nanotubes as a black pigment. Carbon nanotubes are very dark black and have a high luxurious feeling or designability, and there is a demand for use thereof in the automotive field.

Incidentally, millimeter wave radars are in use for the purpose of the autonomous driving or collision prevention of vehicle bodies, and millimeter wave radar devices are mounted in automobiles in many cases. Millimeter waves are, among electromagnetic waves, waves having a wavelength of 1-10 mm and a frequency of 30-300 GHz and are currently in use for in-vehicle radars, full-body scanners that see inside clothes for security check in airports or the like, video transmission from monitoring cameras on platforms at the time of one-man operation of trains and the like. The millimeter wave radar device is a device capable of recognizing obstacles by emitting millimeter waves and receiving rebounding waves and is nowadays in use in the autonomous driving technologies of automobiles and the like due to its long detectable distances and resistance to hindrance attributed to sunlight, rain and fog. In the case of automobile sensors, the millimeter wave radar device is capable of detecting relative distances, relative speeds or the like with respect to obstacles by sending and receiving millimeter waves from antennas.

In addition, in the automotive field, it has been common practice to paint molded bodies with resins to improve designability; however, from the viewpoint of cost reduction or environmental issues, there is a demand for products for which a molded body itself already has designability and does not require painting.

Ordinarily, resin compositions including carbon nanotubes are highly conductive (Patent Literature 1) and are thus in use as parts that need to be conductive in the fields of automobiles, home appliances and construction members, radio wave-absorbing materials for which radio wave characteristics are utilized and radar covers (Patent Literature 2 and 3).

CITATION LIST

Patent Literature

[Patent Literature 1]
    Japanese Patent Laid-Open No. 2016-108524
[Patent Literature 2]
    Japanese Patent Laid-Open No. 2017-512847
[Patent Literature 3]
    Japanese Patent Laid-Open No. 2016-504471

SUMMARY OF INVENTION

However, resin compositions and molded bodies made to be very dark black with carbon nanotubes are highly conductive and thus absorb radio waves, which creates a problem in that it is difficult to apply such resin compositions and molded bodies to resin products for housings that are required to transmit millimeter waves (for example, products having a millimeter wave radar device installed behind such as car bumpers).

Therefore, an objective of the present disclosure is to provide a molded body that is for use as a housing and transmits electromagnetic waves such as millimeter waves but is still very dark black, a resin composition that is for use in forming the molded body for a housing and has favorable molding fluidity, and a masterbatch.

The present disclosure relates to a molded body for a housing that is formed from a resin composition that includes a thermoplastic resin (A) and carbon nanotubes (B), in which the carbon nanotubes (B) satisfy all of the following (1)-(3), the molded body includes 0.10-2 parts by mass of the carbon nanotubes (B) per 100 parts by mass of the thermoplastic resin (A), and a surface resistivity of the molded body is at least $1.0 \times 10^{11} \Omega/\square$, a resin composition that is for use in forming the molded body for a housing, and a masterbatch.

(1) A surface oxygen concentration is 1.0-5.0 mol %.

(2) In powder X-ray diffraction analysis, a diffraction peak half width of a (002) plane is 4.5° or less.

(3) A ratio (G/D ratio) of a maximum peak intensity G within a range of 1560-1600 $cm^{-1}$ to a maximum peak intensity D within a range of 1310-1350 $cm^{-1}$ in a Raman spectrum is less than 0.88.

The present disclosure makes it possible to provide a molded body that is for use as a housing and transmits electromagnetic waves such as millimeter waves but is still very dark black, a resin composition that is for use in forming the molded body for a housing and has favorable molding fluidity, and a masterbatch.

DESCRIPTION OF EMBODIMENTS

Hereinafter, the present disclosure will be described in detail. In the present specification, "film" and "sheet" are the same meaning. In addition, numerical ranges that are specified using "to" in the present specification are assumed to include numerical values before and after "to" as the ranges of the lower limit value and the upper limit value. Regarding a variety of components that appear in the present specification, unless particularly annotated, one kind of each component may be independently and singly used or two or more kinds thereof may be jointly used.

<<Molded Body>>

A molded body of the present disclosure will be described. The molded body of the present disclosure is for use as a housing. The housing refers to a box or the like including a machine, electrical device or the like having some kind of function, is not particularly limited to a certain housing and can be used as a housing such as a case of a smartphone or a personal computer or an external panel of an automobile or an airplane or the like. In addition, the molded body may be used as a housing as it is or the molded body may be used as a housing after being painted or the like.

The molded body is formed from a resin composition that includes a thermoplastic resin (A) and carbon nanotubes (B), the carbon nanotubes (B) satisfy all of the following (1)-(3), the molded body includes 0.10-2 parts by mass of the carbon nanotubes (B) per 100 parts by mass of the thermoplastic resin (A), and the surface resistivity of the molded body is at least $1.0 \times 10^{11} \Omega / \square$.

(1) The surface oxygen concentration is 1.0-5.0 mol %.

(2) In powder X-ray diffraction analysis, the diffraction peak half width of a (002) plane is 4.5° or less.

(3) The ratio (G/D ratio) of the maximum peak intensity G within a range of 1560-1600 $cm^{-1}$ to the maximum peak intensity D within a range of 1310-1350 $cm^{-1}$ in a Raman spectrum is less than 0.88.

Ordinarily, molded bodies for which carbon nanotubes are used can be very dark black, but develop conductivity and absorb electromagnetic waves such as millimeter waves, and thus it is difficult to use the molded bodies as a housing that is used near a device that sends and receives radio waves such as a radar. However, when 0.1-2 parts by mass of the carbon nanotubes (B) are used per 100 parts by mass of the thermoplastic resin (A), and the surface resistivity of the molded body is at least $1.0 \times 10^{11} \Omega / \square$, it is possible to produce molded bodies that transmit electromagnetic waves such as millimeter waves but are still very dark black. The surface resistivity of the molded body is preferably $1.0 \times 10^{12} - 1.0 \times 10^{16} \Omega / \square$ from the viewpoint of the radio wave characteristics of millimeter waves or the like. In such a case, it is possible to produce molded bodies that transmit electromagnetic waves such as millimeter waves but are still dark black to a greater degree.

As a method for measuring the surface resistivity, the surface resistivity can be measured and obtained using a resistivity meter "HIRESTA-UX" (HIRESTA-UX MCP-HT800 resistivity meter, four-terminal four-point probe array constant current application method according to JIS-K 7194, manufactured by Mitsubishi Chemical Analytech Co., Ltd.) (four-terminal probe with intervals of 0.5 cm, application voltage of 500 V).

The molded body of the present disclosure preferably has a thickness of 0.5-5 mm from the viewpoint of easiness of molding and the intended use. When 0.1-2 parts by mass of the carbon nanotubes (B) are used per 100 parts by mass of the thermoplastic resin (A), and the surface resistivity is at least $1.0 \times 10^{11} \Omega / \square$, it is possible to make even a molded body having a thickness of 0.5-5 mm be very dark black and excellent in terms of a property of transmitting electromagnetic waves. Particularly, in a case where the molded body is used in a housing such as a car bumper, a preferable range is 1.0-3.0 mm. This is a suitable range for easiness of molding, weight reduction or the maintenance of mechanical properties.

In order to form the molded body, a resin composition or masterbatch of the present disclosure and the thermoplastic resin (A2) are blended together, melted and mixed together in a molding machine set to, normally, 50° C.-350° C., and then the mixture is molded into the shape of the molded body and cooled, whereby the molded body can be obtained. As the shape of the molded body, a plate shape, a rod shape, a fiber, a tube, a pipe, a bottle, a film or the like can be obtained.

In addition, as a molding method, for example, film molding such as extrusion molding, injection molding, blow molding, compression molding, transfer molding, T-die molding or inflation molding, calender molding, spinning or the like can be used, and injection molding is preferable.

Regarding the use of the molded body of the present disclosure, it is possible to use the molded body in a variety of uses such as auto parts, home appliances and construction materials where designability and an electromagnetic wave-transmitting property are required. In addition, the molded body of the present disclosure has a function of transmitting electromagnetic waves such as millimeter waves but is still very dark black and thus can be preferably used in in-vehicle articles for which designability is required and into which a device that sends and receives electromagnetic waves such as millimeter waves is built, for example, a car bumper, an interior part such as an installment panel and the like from the viewpoint of the recent degree of attention or quantity demanded.

<<Resin Composition>>

The molded body of the present disclosure is formed from a resin composition that includes a thermoplastic resin (A) and carbon nanotubes (B). It is important that the resin composition includes 0.10-2 parts by mass of the carbon nanotubes (B) per 100 parts by mass of the thermoplastic resin (A). The amount of the carbon nanotubes included is more preferably 0.10-1.5 parts by mass and still more preferably 0.2-1.5 parts by mass. When 0.10 parts by mass or more of the carbon nanotubes are included, the molded body can be sufficiently dark black, and, when 2 parts by mass or less of the carbon nanotubes are included, it is less likely that the carbon nanotubes are poorly dispersed, the occurrence rate of clogging by aggregates of undispersed carbon nanotubes at the time of extrusion or film molding is decreased, the appearance of the molded body is improved, and hindrance to radio waves such as millimeter waves is also suppressed.

The resin composition of the present disclosure may be used after being made into a masterbatch that includes a thermoplastic resin (A1) and the carbon nanotubes (B), contains a relatively high concentration of the carbon nanotubes and is diluted with a thermoplastic resin (A2) at the time of molding or may be a compound that contains a relatively low concentration of the carbon nanotubes (B) and is subjected to molding with an unchanged composition without being diluted with the thermoplastic resin. The resin composition is preferably a masterbatch that can be provided in a high concentration from the viewpoint of the addition cost or the inventory cost. The masterbatch preferably has a pellet shape that is easy to handle.

In the masterbatch, it is important that the content of the carbon nanotubes (B) is 1-30 parts by mass per 100 parts by mass of the thermoplastic resin (A1), which is a base resin, and the content is more preferably 10-20 parts by mass from the viewpoint of the cost performance or the dispersibility. When the content is within the above-described range, it is possible for the dispersibility of the carbon nanotubes (B) to further improve at the time of forming a molded body by diluting the masterbatch.

The masterbatch that includes the thermoplastic resin (A1) and the carbon nanotubes (B) can be made into a resin composition by being melt-kneaded with the thermoplastic resin (A2), which is a dilution resin. That is, a molded body formed using this resin composition includes 0.1-2 parts by mass of the carbon nanotubes (B) per 100 parts by mass of the thermoplastic resin (A) including the thermoplastic resin (A1) and the thermoplastic resin (A2). Here, the thermoplastic resin (A1) refers to the base resin of the masterbatch, the thermoplastic resin (A2) refers to the dilution resin of the masterbatch, and the thermoplastic resin (A1) and the thermoplastic resin (A2) may be the same thermoplastic resin or may be different thermoplastic resins. The thermoplastic resins are preferably the same thermoplastic resin in terms of the compatibility of the thermoplastic resins since the fluidity and stability of the resin composition are excellent.

A method for producing the resin composition and the masterbatch of the present disclosure is not particularly limited. For example, the thermoplastic resin (A), the carbon nanotubes (B) and, furthermore, an additive or the like as necessary are added, mixed with a Henschel mixer, a tumbler, a disperser or the like, mixed or melt-kneaded and dispersed with a batch kneader such as a kneader, a roll mill, a super mixer, a Henschel mixer, a SCHUGI mixer, a vertical granulator, a high-speed mixer, a pharmatrix, a ball mill, a steel mill, a sand mill, a vibration mill, an attritor or a Banbury mixer, a twin screw extruder, a single screw extruder, a rotor-type twin screw kneader or the like, whereby a resin composition having a shape such as a pellet shape, a powder shape, a granule shape or a bead shape can be obtained. In the present disclosure, a twin screw extruder is preferably used for the melt kneading. In addition, the shape may be a powder shape or a flake shape but is preferably a pellet shape which is easy to handle.

The resin composition preferably contains no volatile components or a small amount of a volatile component even when containing the volatile component. The content of the volatile component such as a solvent or a low-molecular-weight component in 100 mass % of the resin composition is preferably 5 mass % or less and more preferably 1 mass % or less. In the resin composition of the present disclosure, carbon nanotubes are uniformly distributed in the thermoplastic resin (A) by the melt kneading using the carbon nanotubes (B), which makes it possible to form a molded body having an excellent property of being dark black and an excellent electromagnetic wave-transmitting property.

<Thermoplastic Resin (A)>

The thermoplastic resin (A) that is used in the present disclosure will be described. The thermoplastic resin (A) that is used in the present disclosure is not particularly limited as long as resins can be molded by heating and melting. Examples of the thermoplastic resin (A) include polyolefin-based resins such as a polyethylene resin (PE) and a polypropylene resin (PP), polystyrene-based resins (PS), polyphenylene ether-based resins, a polyethylene terephthalate resin (PET), a polybutylene terephthalate resin (PBT), an acrylonitrile-butadiene-styrene copolymer resin (ABS), a polycarbonate resin (PC), a polyamide resin (PA), a polyacetal resin (POM), polyester-based resins, a polyvinyl chloride resin, an acrylic resin, a polyetherimide resin (PEI), a polyphenylene sulfide resin, a polyurethane resin (PU), liquid silicone rubber (LSR) and the like. From the viewpoint of versatility, mechanical properties or the like, a polyethylene resin, a polypropylene resin, an acrylonitrile-butadiene-styrene copolymer resin, a polycarbonate resin, a polyamide resin or a polybutylene terephthalate resin is preferable.

<Carbon Nanotubes (B)>

The carbon nanotubes (B) that are used in the present disclosure will be described. For the carbon nanotubes (B) that are used in the present disclosure, (1) The surface oxygen concentration is 1.0-5.0 mol %.

(2) In powder X-ray diffraction analysis, the diffraction peak half width of a (002) plane is 4.5° or less.

(3) The ratio (G/D ratio) of the maximum peak intensity G within a range of 1560-1600 $cm^{-1}$ to the maximum peak intensity D within a range of 1310-1350 $cm^{-1}$ in a Raman spectrum is less than 0.88.

The carbon nanotube has a structure in which a graphene sheet is rounded into a cylindrical shape, is called a single-wall carbon nanotube (SWCNT) in the case of a single layer and a multi-wall carbon nanotube (MWCNT) in the case of multiple layers, and each carbon nanotube can be confirmed with an electronic microscope or the like. Regarding the carbon nanotubes, carbon nanotube fibers are primarily aggregated together to intertwine or form bundle-like primary aggregates, and there are cases where the primary aggregates are aggregated to form secondary or higher aggregates.

[Surface Oxygen Concentration]

The surface oxygen concentration of the carbon nanotubes (B) in X-ray photoelectron spectroscopy is 1.0-5.0 mol % and preferably 2.0-4.8 mol %. When the surface oxygen concentration is less than 1.0 mol %, since a crushing treatment is insufficient, and a large number of relatively long carbon nanotubes are present, a conduction path is formed, and the radio wave characteristics of millimeter waves or the like are affected. On the other hand, when the surface oxygen concentration exceeds 5.0 mol %, the crushing treatment becomes excessive, the destruction of the fiber structure of the carbon nanotubes progresses excessively, and the property of being dark black deteriorates.

The surface oxygen concentration of the carbon nanotubes (B) is obtained according to the following procedure. Measurement was performed using an X-ray photoelectron spectroscope (K-Alpha+, manufactured by Thermo Fisher Scientific Inc.) under conditions of X-ray anode: monochromatic (Al), current: 6 mA, voltage: 12 kV, analysis area: approximately 0.8 mm×0.4 mm and observation depth:

several nanometers, after the measurement, quantitative measurement was performed on detected elements, and the surface oxygen concentration (mol %) of an oxygen atom was obtained.

[X-Ray Diffraction Peak Half Width]

It is important that the diffraction peak half width of a (002) plane of the carbon nanotube (B) is 4.5° or less. The diffraction peak half width is preferably 2.0°-4.0°. When the diffraction peak half width is 4.5° or less, the particle sizes of the carbon nanotube do not become too small, and it is possible to decrease an influence on the millimeter wave-transmitting property, which can be caused by the carbon nanotubes in the molded body and the resin composition becoming denser. Particularly, in a case where the diffraction peak half width is 2.0° or more, the particle sizes of the carbon nanotube do not become too large, and it is possible to maintain the molded body sufficiently dark black, which is preferable.

The (002) plane of the carbon nanotube (B) is detected at a position of $2\theta=25°±2°$, which changes depending on the interplanar spacing between carbon hexagonal honeycomb planes. As the angle of the peak position becomes higher, the distance between carbon hexagonal honeycomb planes becomes closer, which indicates that the graphitic regularity of the structure is high. In addition, as the peak becomes sharper (the half width becomes smaller), the crystallite sizes become larger, which indicates that the crystal structure has been developed.

The half width of the carbon nanotube (B) is obtained as described below. First, the carbon nanotube (B) is stuffed into a predetermined sample holder such that the surface becomes flat, set in a powder X-ray diffraction analyzer and measured with the irradiation angle of an X-ray source changed from 5°-80°. As the X-ray source, for example, $CuK\alpha$ rays are used. The step width is 0.010°, and the measurement time is 1.0 second. A diffraction angle $2\theta$ at which a peak appears at that time is read, whereby the carbon nanotube (B) can be evaluated. For graphite, a peak is normally detected at $2\theta$ of near 26°, and the peak is known to be a peak attributed to interlayer diffraction. Since the carbon nanotube (B) also has a graphite structure, a peak attributed to graphite interlayer diffraction is detected near this angle. However, a carbon nanotube has a cylindrical structure, and thus the value is different from that of graphite. A peak appears at a position of the value $2\theta=25°±2°$, whereby it is possible to determine that the carbon nanotube contains a composition having not a single layer but a multilayer structure. Since the peak that appears at the position is a peak attributed to the interlayer diffraction of the multilayer structure, it becomes possible to determine the number of layers of the carbon nanotube (B). Since the number of layers is one for a single-wall carbon nanotube, when only single-wall carbon nanotubes are included, no peaks appear at a position of $2\theta=25°±2°$. However, even when single-wall carbon nanotubes are included, there are no cases where only single-wall carbon nanotubes are included, and, in a case where multi-wall carbon nanotubes or the like are included together with the single-wall carbon nanotubes in a mixed form, there are cases where a peak appears at a position of $2\theta=25°±2°$.

For the carbon nanotube (B) of the present embodiment, a peak appears at a position of $2\theta=25°±2°$. In addition, the layer configuration can also be analyzed from the half width of the peak at 25°±2°, which is detected by powder X-ray diffraction analysis. That is, it is considered that, as the half width of this peak becomes smaller, the number of layers of the carbon nanotube (B) becomes larger. Conversely, it is considered that, as the half width of this peak becomes larger, the number of layers of the carbon nanotube (B) becomes smaller.

When powder X-ray diffraction analysis is performed on the carbon nanotube (B) of the present embodiment, a peak is present at a diffraction angle $2\theta=25°±2°$, and the half width of the peak of this (002) plane is 4.5° or less.

[Raman Spectrum G/D Ratio]

For the carbon nanotubes (B), it is important that the G/D ratio where the maximum peak intensity within a range of 1560-1600 $cm^{-1}$ in a Raman spectrum is indicated by G and the maximum peak intensity D within a range of 1310-1350 $cm^{-1}$ is indicated by D is less than 0.88. In order to satisfy both the property of being dark black and the millimeter wave-transmitting property, particularly, the G/D ratio is preferably 0.60-0.85. When the G/D ratio is less than 0.88, a conduction pass is not appropriately formed in the carbon nanotubes, and an excellent millimeter wave-transmitting property is exhibited.

The G/D ratio can be calculated from the integral values of peaks in a G band derived from the graphite structure at near 1590 $cm^{-1}$ and a D band derived from a structural defect near 1350 $cm^{-1}$ based on measurement that is performed on a powder specimen installed in a microscopic laser Raman spectrophotometer (NRS-3100, JASCO Corporation) using a laser wavelength of 532 nm. A Raman shift that is shown at near 1590 $cm^{-1}$ in the Raman spectrum is called a graphite-derived G band, and a Raman shift that is shown at near 1350 $cm^{-1}$ is called a D band derived from a defect of amorphous carbon or graphite. As this G/D ratio of the carbon nanotubes becomes higher, the degree of graphitization becomes higher.

[Average Diameter]

The carbon nanotubes (B) that are used in the present disclosure preferably have an average diameter of 8-20 nm. When the average diameter of the carbon nanotubes of the present disclosure is 8-20 nm, the millimeter wave loss becomes smaller while the dispersibility and the property of being dark black are maintained. The average diameter is particularly preferably 9-15 nm. When the average diameter is 8 nm or more, the millimeter wave-transmitting property becomes more favorable, which is preferable. When the average diameter is 20 nm or less, the property of being dark black of the molded body becomes more favorable, which is preferable.

[Average Aspect Ratio]

The average aspect ratio of the carbon nanotubes (B) is preferably 10-700 and more preferably 50-500. When carbon nanotubes having smaller aspect ratios are used, at the time of kneading a high concentration of the carbon nanotubes in the molded body or the resin composition, it becomes difficult for the carbon nanotubes to form a conduction pass, and an effect of enabling the transmission of radio waves such as millimeter waves is exhibited while a high property of being dark black is maintained, which is preferable. The average aspect ratio mentioned herein is the ratio of the number-average values of the short axis lengths and long axis lengths of the individual carbon nanotubes obtained by electron microscopic observation and is a value calculated by the following (formula 1).

$$\text{Average aspect ratio} = \text{number-average value of long axis lengths} \div \text{number-average value of short axis lengths} \quad \text{(Formula 1)}$$

The average diameter and average aspect ratio of the carbon nanotubes (B) can be obtained by image analysis.

Regarding the average diameter and the average aspect ratio, for example, the carbon nanotubes are observed using a scanning electron microscope (manufactured by JEOL Ltd., JSM-6700M) at an accelerating voltage of 5 kV, and a 50,000-time image (number of pixels: 1024×1280) is captured. Next, the short axis length and long axis length of each of 20 arbitrary carbon nanotubes in the captured image are measured, whereby the aspect ratio can be obtained. In addition, the number-average value of the obtained short axis lengths is regarded as the average diameter of the carbon nanotubes.

[Bulk Density]

The bulk density of the carbon nanotubes (B) is preferably 0.07-0.2 g/mL, more preferably 0.07-0.13 g/mL and still more preferably 0.08-0.11 g/mL. In the case of using carbon nanotubes having a bulk density within the above-described range, the dispersibility with respect to the thermoplastic resin (A) becomes favorable, and the productivity during kneading is excellent.

The bulk density mentioned herein is the ratio of the mass of a specimen to the container volume when a Scott volumeter (manufactured by Tsutsui Scientific Instruments Co., Ltd.) is used as a measuring instrument, a carbon nanotube powder is poured into a right cylindrical container from the upper part of the measuring instrument, and the mass of the specimen of a certain volume obtained by rubbing through the heaped powder is measured and is a value calculated based on the following (formula 2).

$$\text{Bulk density (g/mL)} = (\text{mass (g) of rubbed-through carbon nanotubes of certain volume}) \div (\text{container volume (mL)}) \quad \text{(Formula 2)}$$

The carbon nanotubes (B) may be single-wall carbon nanotubes, multi-wall carbon nanotubes rounded in two or more layers or a mixture of both but are preferably multi-wall carbon nanotubes from the viewpoint of the cost and the strength. In addition, carbon nanotubes having not a graphite structure but an amorphous structure in the side wall may also be used.

Ordinarily, the carbon nanotubes (B) can be manufactured by a laser ablation method, an arc discharge method, a chemical vapor deposition method (CVD), a combustion method or the like and may be carbon nanotubes manufactured by any method. Particularly, the CVD method is a method by which a large number of carbon nanotubes can be produced at a low cost by bringing fine catalyst particles containing a metal catalyst such as iron or nickel supported by a carrier such as silica, alumina, magnesium oxide, titanium oxide, silicate, diatomaceous earth, alumina/silica, silica/titania or zeolite and a carbon-containing gas of a raw material into contact with each other at a high temperature of 400° C.-1000° C. and is also preferable for the carbon nanotubes that are used in the present disclosure.

For the carbon nanotubes (B) of the present disclosure, the surface oxygen concentration, the X-ray diffraction peak half width and the Raman spectrum G/D ratio can be controlled to be within the ranges of the present disclosure by performing a crushing treatment on conventional commercially available carbon nanotubes. The average outer diameter of untreated carbon nanotubes on which the crushing treatment is not performed is preferably 1.0-13.0 nm and more preferably 1.0-8.0 nm.

Examples of a crushing treatment step include methods in which the carbon nanotubes are crushed using a crusher having crushing media such as beads or steel balls built-in with no liquid substances substantially interposed therebetween. Crushing is performed using a crushing force or destructive force attributed to the collision between the crushing media. As a dry-type crusher, it is possible to use a well-known method such as a dry-type attritor, ball mill, vibration mill or bead mill, and the crushing time can be arbitrarily set depending on the device or a desired surface oxygen concentration. Dry-type crushing using a bead mill is capable of efficiently imparting collision energy to the carbon nanotubes and is thus preferable.

Examples of the material of the crushing media include iron, stainless steel, zirconia and the like. Examples of the stainless steel include austenite-based stainless steel, martensite-based stainless steel, ferrite-based stainless steel and precipitation hardening stainless steel, any of these can be used, but austenite-based stainless steel is preferable from the viewpoint of the crushing efficiency.

The outer diameter of the crushing medium is preferably 1-5 mm and more preferably 1-2 mm. Within the above-described range, a desired crushing force can be obtained, and it is possible to obtain a desired surface oxygen concentration by efficiently crushing a pigment without excessively destructing the fiber shapes of the carbon nanotubes.

<Other Components>

For the molded body, resin composition and masterbatch of the present disclosure, an oxidation-resistant stabilizer, a weather-resistant stabilizer, an antistatic agent, a dye, a pigment, a dispersant, a coupling agent, a crystal nucleating agent, a resin filler or the like can be used as necessary.

EXAMPLES

Hereinafter, the present disclosure will be described in more detail using examples, the examples by the present disclosure can be modified in a variety of other forms, and the following examples do not limit the present disclosure by any means. "Parts" in the examples indicates "parts by mass" and "%" indicates "mass %."

The surface oxygen concentration, powder X-ray diffraction analysis, Raman spectroscopy and average diameter of carbon nanotubes, the surface resistivity of a molded body were measured by the following methods.

<Surface Oxygen Concentration>

The surface oxygen concentration of the carbon nanotubes was obtained according to the following procedure. Measurement was performed using an X-ray photoelectron spectroscope (K-Alpha+, manufactured by Thermo Fisher Scientific Inc.) under conditions of X-ray anode: monochromatic (Al), current: 6 mA, voltage: 12 kV, analysis area: approximately 0.8 mm×0.4 mm and observation intervals: several nanometers, after the measurement, quantitative measurement was performed on detected elements, and the surface oxygen concentration (mol %) of an oxygen atom was obtained.

<Powder X-Ray Diffraction Analysis>

The carbon nanotubes were placed on the central recess part of an aluminum specimen plate (outer diameter $\phi$: 46 mm, thickness: 3 mm, specimen part $\phi$: 26.5 mm, and thickness: 2 mm) and flattened using slide glass. After that, weighing paper was placed on the surface on which the specimen was placed, and, furthermore, a surface on which aluminum Hi-Sheet packing was placed was flattened by applying a load of one ton thereto. After that, the weighing paper and the aluminum Hi-Sheet packing were removed, thereby obtaining a sample for the powder X-ray diffraction analysis of the carbon nanotubes. After that, the sample for the powder X-ray diffraction analysis of the carbon nanotubes was installed in an X-ray diffractometer (Ultima 2100, manufactured by Rigaku Corporation), the X-ray diffractometer was operated from 15° to 35°, and analysis was performed. Sampling was performed every 0.02°, and the scanning speed was set to 2°/min. The voltage was set to 40 kV, the current was set to 40 mA, and CuK$\alpha$ rays were used as the X-ray source. The plots of a (002) plane of the carbon nanotubes that appeared at a diffraction angle 2$\theta$=25°±2°, which were obtained at this time, were each 11-point-simple-moving-averaged, and the half width of the peak was regarded as the half width of the carbon nanotubes. As the base line, a line connecting the plots at 2$\theta$=16° and 2$\theta$=34° was used.

<Raman Spectroscopy>

The carbon nanotubes were installed in a microscopic laser Raman spectrophotometer (NRS-3100, JASCO Corporation) and measured using a laser wavelength of 532 nm. As the measurement conditions, the loading time was set to 60 seconds, the cumulative number was set to twice, the neutral density filter was set to 10%, the magnification of the objective lens was set to 20 times, the confocal hole was set to 500, the slid width was set to 100 μm, and the measurement wavelength was set to 100-3000 cm$^{-1}$. The carbon nanotubes for measurement were distributed on slide glass and flattened using a spatula. Among the obtained peaks, the maximum peak intensity within a range of 1560-1600 cm$^{-1}$ in the spectrum was indicated by G, the maximum peak intensity D within a range of 1310-1350 cm$^{-1}$ was indicated by D, and the ratio of G/D was regarded as the G/D ratio of the carbon nanotubes.

<Average Diameter>

The carbon nanotubes were observed using a scanning electron microscope (manufactured by JEOL Ltd., JSM-6700M) at an accelerating voltage of 5 kV, and a 50,000-time image (number of pixels: 1024×1280) was captured. Next, the short axis length of each of 20 arbitrary carbon nanotubes in the captured image was measured, and the number-average value of those short axis lengths was regarded as the average diameter of the carbon nanotubes.

<Surface Resistivity>

The surface resistivity [$\Omega$/$\square$] of the molded body was measured using a resistivity meter "HIRESTA-UX" (HIRESTA-UX MCP-HT800 resistivity meter, four-terminal four-point probe array constant current application method according to JIS-K 7194, manufactured by Mitsubishi Chemical Analytech Co., Ltd.) (four-terminal probe with intervals of 0.5 cm).

Materials used in the examples and comparative examples are as described below.

<Thermoplastic Resins (A)>

(A-1): PP resin (polypropylene, BC03BSW, Japan Polypropylene Corporation)

(A-2): PE resin (SUNTEC, M2270, Asahi Kasei Corporation)

(A-3): ABS resin (CEVIAN, T500, Daicel Miraizu Ltd.)

(A-4): PBT resin (TORAYCON, 1401X06, Toray Industries, Inc.)

(A-5): PC resin (IUPILON, E2000, Mitsubishi Engineering-Plastics Corporation).

(A-6): PA resin (AMILAN, CM1014-V0, Toray Industries, Inc.)

<Carbon Nanotubes (B)>

(Carbon Nanotubes (B-1))

Ten parts of untreated carbon nanotubes (CM-130: manufactured by Hanwha Chemical hanos, average diameter: 15.0 nm) and 200 parts of zirconia beads having a diameter of 2 mm as crushing media were prepared, and a crushing treatment was performed with a paint shaker for 15 minutes, thereby obtaining carbon nanotubes (B-1).

(Carbon Nanotubes (B-2 to 8, BC-1 to 8))

In Table 1, the kinds and average diameters of untreated carbon nanotubes, the crushing treatment times, the average diameters, oxygen concentrations, half widths and G/D ratios of treated carbon nanotubes are each shown. Carbon nanotubes (B-2 to 8 and BC-1 to 8) were obtained by the same method as for the carbon nanotubes (B-1) except that carbon nanotubes shown in Table 1 were used and the crushing treatment time was changed.

<Untreated Carbon Nanotubes>

CM-130: manufactured by Hanwha Chemical hanos, average diameter: 15.0 nm

SMW210: manufactured by SouthWest NanoTechnolgies, average diameter: 9.0 nm

Flotube 7010: manufactured by Jiangsu Cnano Technology Co., Ltd., average diameter: 7.0 nm Flotube 7000: manufactured by Jiangsu Cnano Technology Co., Ltd., average diameter: 6.0 nm NTP 3121: manufactured by Shenzhen Nanotech Port Co., Ltd., average diameter: 30.0 nm

TABLE 1

| | Untreated carbon nanotubes | | Crushing treatment of carbon nanotubes | Physical property values | | |
| | | | | (1) | (2) | |
| | Kind | Average diameter [nm] | Treatment time [min.] | Average diameter [nm] | Oxygen concentration [mol %] | Half width [°] | (3) G/D ratio |
|---|---|---|---|---|---|---|---|
| B-1 | CM-130 | 15.0 | 15 | 14.8 | 2.9 | 2.5 | 0.87 |
| B-2 | CM-130 | 15.0 | 30 | 13.9 | 3.5 | 2.4 | 0.85 |

TABLE 1-continued

| | | Crushing treatment of carbon nanotubes | | | | | |
| | | Untreated carbon nanotubes | | Physical property values | | | |
| | | | | | (1) | (2) | |
| | Kind | Average diameter [nm] | Treatment time [min.] | Average diameter [nm] | Oxygen concentration [mol %] | Half width [°] | (3) G/D ratio |
|---|---|---|---|---|---|---|---|
| B-3 | CM-130 | 15.0 | 60 | 13.8 | 4.8 | 2.2 | 0.83 |
| B-4 | SMW210 | 9.0 | 15 | 9.1 | 2.9 | 3.5 | 0.86 |
| B-5 | SMW210 | 9.0 | 30 | 9.0 | 3.2 | 3.6 | 0.85 |
| B-6 | SMW210 | 9.0 | 60 | 8.9 | 4.0 | 3.8 | 0.82 |
| B-7 | SMW210 | 9.0 | 90 | 8.8 | 4.2 | 3.9 | 0.81 |
| B-8 | SMW210 | 9.0 | 200 | 8.0 | 5.0 | 4.0 | 0.81 |
| BC-1 | CM-130 | 15.0 | 0 | 15.0 | 0.5 | 2.5 | 0.94 |
| BC-2 | SMW210 | 9.0 | 0 | 9.0 | 0.5 | 3.5 | 0.88 |
| BC-3 | Flotube7010 | 7.0 | 0 | 7.0 | 0.5 | 5.2 | 0.86 |
| BC-4 | Flotube7010 | 7.0 | 90 | 6.8 | 3.8 | 4.7 | 0.66 |
| BC-5 | Flotube7010 | 7.0 | 300 | 6.2 | 8.2 | 5.3 | 0.78 |
| BC-6 | Flotube7000 | 6.0 | 0 | 6.0 | 0.5 | 6.4 | 0.70 |
| BC-7 | Flotube7000 | 6.0 | 60 | 5.8 | 2.5 | 6.3 | 0.62 |
| BC-8 | NTP3121 | 30.0 | 60 | 29.5 | 3.5 | 2.0 | 0.88 |

Example 1

0.75 Parts of the carbon nanotubes (B-1) with respect to 100 parts of the thermoplastic resin (A-1) (polypropylene resin, BC03BSW, Japan Polypropylene Corporation) were put into a twin screw extruder (manufactured by Nippon Placon Co., Ltd.), extruded at 200° C. and cut with a pelletizer, thereby obtaining a resin composition 1. Next, the obtained resin composition 1 was kneaded with two rolls heated to 160° C.-180° C., thereby producing a 1 mm-thick press sheet, which was a carbon nanotube (CNT) molded body. The surface resistivity of the obtained molded body was $2.0 \times 10^{11}$ [$\Omega/\square$].

Examples 2 to 16 and Comparative Examples 1 to 10

Resin compositions were manufactured by the same method as in Example 1 except that the compositions and the amounts blended (parts by mass) were changed as shown in Table 2, and then 1 mm-thick press sheets, which were CNT molded bodies, were produced.

Example 17

Two parts of the carbon nanotubes (B-2) with respect to 100 parts of the thermoplastic resin (A-1) (polypropylene resin, BC03BSW, Japan Polypropylene Corporation) as a thermoplastic resin (A1) were put into a twin screw extruder (manufactured by Nippon Placon Co., Ltd.), extruded at 220° C. and cut with a pelletizer, thereby obtaining a pellet-like masterbatch 1 (MB-1). Next, the obtained masterbatch 1 and the thermoplastic resin (A-1) were kneaded with two rolls heated to 160° C.-180° C. so that the final content rate in a molded body became 0.75 parts of the carbon nanotubes (B-2) with respect to 100 parts of the thermoplastic resin (A-1) as the thermoplastic resin (A), thereby producing a 1 mm-thick press sheet as a CNT molded body. The surface resistivity of the obtained molded body was $6.0 \times 10^{11}$ [$\Omega/\square$].

Examples 18 to 21

Masterbatches were manufactured by the same method as in Example 17 except that the compositions and the amounts blended (parts by mass) were changed as shown in Table 3, and then 1 mm-thick press sheets, which were CNT molded bodies, were produced.

Reference Example 1

A resin composition obtained by weighing carbon black (NITERON 10 (furnace black powder, average particle diameter: 40 nm, DBP oil absorption amount: 128 mL/100 g, manufactured by Nippon Steel Carbon Co., Ltd.)) so that the content thereof reached 0.75 parts with respect to 100 parts of the thermoplastic resin (A-1) (polypropylene resin, BC03BSW, Japan Polypropylene Corporation), putting the carbon black into a twin screw extruder (manufactured by Nippon Placon Co., Ltd.), extruding the carbon black at 200° C. and cutting the carbon black with a pelletizer was kneaded with two rolls heated to 160° C.-180° C., thereby producing a 1 mm-thick press sheet, which was a carbon black (CB) molded body.

The surface resistivities of the obtained molded bodies are shown in Tables 2 and 3.

TABLE 2

| | Thermoplastic resin | CNT | CNT content with respect to 100 parts of resin (A) | Surface resistivity [$\Omega/\square$] |
|---|---|---|---|---|
| Example 1 | A-1 | B-1 | 0.75 | $2.0 \times 10^{11}$ |
| Example 2 | A-1 | B-2 | 0.75 | $5.0 \times 10^{12}$ |
| Example 3 | A-1 | B-3 | 0.75 | $7.0 \times 10^{12}$ |
| Example 4 | A-1 | B-4 | 0.75 | $1.0 \times 10^{11}$ |
| Example 5 | A-1 | B-5 | 0.75 | $1.0 \times 10^{13}$ |
| Example 6 | A-1 | B-6 | 0.75 | $6.0 \times 10^{12}$ |
| Example 7 | A-1 | B-7 | 0.75 | $8.0 \times 10^{12}$ |
| Example 8 | A-1 | B-8 | 0.75 | $6.0 \times 10^{14}$ |
| Example 9 | A-1 | B-2 | 0.10 | $7.0 \times 10^{17}$ |
| Example 10 | A-1 | B-2 | 1.5 | $8.0 \times 10^{11}$ |
| Example 11 | A-1 | B-2 | 2.0 | $4.0 \times 10^{11}$ |
| Example 12 | A-2 | B-2 | 0.75 | $5.0 \times 10^{11}$ |
| Example 13 | A-3 | B-2 | 0.75 | $4.0 \times 10^{12}$ |
| Example 14 | A-4 | B-2 | 0.75 | $5.0 \times 10^{13}$ |
| Example 15 | A-5 | B-2 | 0.75 | $7.0 \times 10^{12}$ |
| Example 16 | A-6 | B-2 | 0.75 | $2.0 \times 10^{12}$ |
| Comparative Example 1 | A-1 | BC-1 | 0.75 | $1.0 \times 10^{11}$ |

TABLE 2-continued

| | Thermoplastic resin | CNT | CNT content with respect to 100 parts of resin (A) | Surface resistivity [$\Omega/\square$] |
|---|---|---|---|---|
| Comparative Example 2 | A-1 | BC-2 | 0.75 | $2.0 \times 10^{13}$ |
| Comparative Example 3 | A-1 | BC-3 | 0.75 | $7.0 \times 10^{8}$ |
| Comparative Example 4 | A-1 | BC-4 | 0.75 | $3.0 \times 10^{13}$ |
| Comparative Example 5 | A-1 | BC-5 | 0.75 | $2.0 \times 10^{15}$ |
| Comparative Example 6 | A-1 | BC-6 | 0.75 | $5.0 \times 10^{12}$ |
| Comparative Example 7 | A-1 | BC-7 | 0.75 | $3.0 \times 10^{10}$ |
| Comparative Example 8 | A-1 | BC-8 | 0.75 | $7.0 \times 10^{12}$ |
| Comparative Example 9 | A-1 | B-2 | 10 | $8.0 \times 10^{9}$ |
| Comparative Example 10 | A-1 | B-2 | 0.05 | $4.0 \times 10^{12}$ |
| Reference Example 1 | A-1 | — | — | — |

TABLE 3

| | | Masterbatch | | | Molded body | |
|---|---|---|---|---|---|---|
| | Name | Thermoplastic resin | CNT | CNT content with respect to 100 parts of resin (A1) | Dilution resin | CNT content with respect to 100 parts of resin (A) | Surface resistivity [$\Omega/\square$] |
| Example 17 | MB-1 | A-1 | B-2 | 2 | A-1 | 0.75 | $6.0 \times 10^{11}$ |
| Example 18 | MB-2 | A-1 | B-2 | 10 | A-1 | 0.75 | $6.0 \times 10^{11}$ |
| Example 19 | MB-3 | A-1 | B-2 | 20 | A-1 | 0.75 | $5.0 \times 10^{11}$ |
| Example 20 | MB-4 | A-1 | B-2 | 30 | A-1 | 0.75 | $3.0 \times 10^{12}$ |
| Example 21 | MB-5 | A-1 | B-2 | 40 | A-1 | 0.75 | $7.0 \times 10^{12}$ |

<<Evaluation Results of Resin Compositions>>

The evaluation results of the obtained resin compositions were obtained by the following methods. The results are shown in Table 4.

(Molding Fluidity)

The fluidity was evaluated by spiral flow measurement. Regarding the measurement conditions of the spiral flow measurement, the resin compositions obtained in the examples and the comparative examples were injected using an injection molding machine (IS-100F manufactured by Toshiba Industrial Products and Systems Corporation) under the following temperature conditions corresponding to the thermoplastic resins used in the resin compositions, respectively, and an injection pressure condition of 100 MPa and a spiral mold having a width of 10 mm and a thickness of 2 mm until the resin flow was stopped due to cooling and solidification, and the lengths of the test pieces were measured.

<Temperature Conditions>

Thermoplastic resin (A-1): molding temperature of 200° C. and mold temperature of 40° C.

Thermoplastic resin (A-2): molding temperature of 180° C. and mold temperature of 40° C.

Thermoplastic resin (A-3): molding temperature of 220° C. and mold temperature of 60° C.

Thermoplastic resin (A-4): molding temperature of 260° C. and mold temperature of 60° C.

Thermoplastic resin (A-5): molding temperature of 300° C. and mold temperature of 80° C.

Thermoplastic resin (A-6): molding temperature of 280° C. and mold temperature of 80° C.

In the case of using the masterbatch, the masterbatch was blended so that the final content rate in the molded body became 0.75 parts of the carbon nanotubes (B) with respect to 100 parts of the thermoplastic resin (A) and extruded at 200° C., thereby manufacturing pellets. For the extrusion, a twin screw extruder having L/D of 36 and a diameter of 45 mm was used, and the masterbatch was injected using an injection molding machine (IS-100F manufactured by Toshiba Industrial Products and Systems Corporation) and a spiral mold having a width of 10 mm and a thickness of 2 mm under conditions of a molding temperature of 200° C., a mold temperature of 40° C. and an injection pressure of 100 MPa until the resin flow was stopped due to cooling and solidification, and test pieces were manufactured.

[Evaluation Standards]

A: The length of the test piece is 300 mm or longer. Excellent.

B: The length of the test piece is 270 mm or longer and shorter than 300 mm. Favorable.

C: The length of the test piece is 250 mm or longer and less than 270 mm. Practical.

<<Evaluation Results of Molded Bodies>>

The obtained molded bodies were evaluated by the following methods. The results are shown in Table 4. Carbon black has a poor property of being dark black compared with carbon nanotubes, but is inexpensive and thus ordinarily used as a black colorant. However, compared with carbon nanotubes, carbon black has low conductivity and does not hinder radio waves such as millimeter waves. Therefore, the property of being dark black and the millimeter wave-transmitting property were evaluated by comparing the CNT molded body of the present disclosure and the CB molded body for which carbon black was used as a reference example.

(Evaluation of Millimeter Wave-Transmitting Property)

As an index of the millimeter wave-transmitting property, the millimeter wave loss (dB) was measured by the following method. The millimeter wave losses at a measurement frequency of 77 GHz of the CNT molded bodies obtained in the examples and the comparative examples were measured using E8257D+E8257DS12 (output: 4 dBm) as a millimeter wave-sending device, N9030A+M1970V as a millimeter wave-receiving device and AAHR015 (WR15, AET, INC) as a horn antenna (all manufactured by Keysight Technologies) under an environment with a temperature of 24.8° C. and a relative humidity of 48%. The value of the millimeter wave loss of the CB molded body for which the carbon black of Reference Example 1 was used was −0.87 dB. Reference Example 1 and the molded body of the present disclosure were compared with each other (the millimeter wave loss of the CNT molded body—the millimeter wave loss of the CB molded body), and evaluation was performed as described below. When the difference is less than −3.0 dB, the millimeter wave-transmitting property was practical; however, in a case where the molded body is used as a housing of a radio wave-sending and receiving part such as a more precise radar, the difference was preferably less than −2.0 dB and more preferably less than −1.0 dB or a millimeter wave loss smaller than the millimeter wave loss of carbon black.

[Evaluation Standards]

A: The difference is less than −1.0 dB or the millimeter wave loss is smaller than the millimeter wave loss of carbon black. Excellent.

B: The difference is −1.0 dB or more and less than −2.0 dB. Favorable.

C: The difference is −2.0 dB or more and less than −3.0 dB. Practical.

D: The difference is −3.0 dB or more. Practical.

(Measurement of Color Difference)

Regarding the obtained CNT molded bodies, color differences that were indicated by L*a*b* color coordinates were measured using a plastic-oriented computer color matching system AUCOLOR-7X (manufactured by Kurabo becomes more strongly bluish than in molded bodies for which CB, which is ordinarily used as general-purpose black, is used. Therefore, when the L* value, which indicates brightness, is 25.0 or less and the b* value, which indicates a bluish tinge, is a low value of zero or less, particularly, −0.25 or less, the molded body is dark black to a greater degree, which is preferable.

[Color Difference]

ΔL*=L* of molded body−L* of molded body of Reference Example 1

Δa*=a* of molded body−a* of molded body of Reference Example 1

Δb*=b* of molded body−b* of molded body of Reference Example 1

TABLE 4

| | Molding fluidity | Millimeter wave-transmitting property | L* value | a* value | b* value | ΔL* | Δa* | Δb* |
|---|---|---|---|---|---|---|---|---|
| Example 1 | A | B | 24.74 | −0.12 | −0.31 | −0.51 | 0.08 | −0.13 |
| Example 2 | A | A | 24.73 | −0.14 | −0.36 | −0.52 | 0.06 | −0.18 |
| Example 3 | A | A | 24.81 | −0.17 | −0.41 | −0.44 | 0.03 | −0.23 |
| Example 4 | A | B | 24.78 | −0.15 | −0.35 | −0.47 | 0.05 | −0.17 |
| Example 5 | A | A | 24.88 | −0.14 | −0.34 | −0.37 | 0.06 | −0.16 |
| Example 6 | A | A | 24.81 | −0.14 | −0.28 | −0.44 | 0.06 | −0.10 |
| Example 7 | A | A | 24.54 | −0.13 | −0.38 | −0.71 | 0.07 | −0.20 |
| Example 8 | A | A | 24.98 | −0.12 | −0.25 | −0.27 | 0.08 | −0.07 |
| Example 9 | A | A | 24.98 | −0.10 | −0.27 | −0.27 | 0.10 | −0.09 |
| Example 10 | A | A | 24.78 | −0.11 | −0.32 | −0.47 | 0.09 | −0.14 |
| Example 11 | A | B | 24.73 | −0.14 | −0.36 | −0.52 | 0.06 | −0.18 |
| Example 12 | A | A | 24.80 | −0.13 | −0.36 | −0.45 | 0.07 | −0.18 |
| Example 13 | A | A | 24.85 | −0.17 | −0.42 | −0.40 | 0.03 | −0.24 |
| Example 14 | A | A | 24.88 | −0.12 | −0.35 | −0.37 | 0.08 | −0.17 |
| Example 15 | A | A | 24.77 | −0.15 | −0.33 | −0.48 | 0.05 | −0.15 |
| Example 16 | A | A | 24.76 | −0.09 | −0.40 | −0.49 | 0.11 | −0.22 |
| Comparative Example 1 | B | D | 24.61 | −0.14 | −0.36 | −0.64 | 0.06 | −0.18 |
| Comparative Example 2 | B | D | 24.67 | −0.17 | −0.29 | −0.58 | 0.03 | −0.11 |
| Comparative Example 3 | B | D | 24.13 | −0.12 | −0.29 | −1.12 | 0.08 | −0.11 |
| Comparative Example 4 | A | C | 24.64 | −0.16 | −0.23 | −0.61 | 0.04 | −0.05 |
| Comparative Example 5 | B | A | 25.35 | −0.14 | −0.12 | 0.10 | 0.06 | 0.06 |
| Comparative Example 6 | B | D | 24.95 | −0.09 | −0.15 | −0.30 | 0.11 | 0.03 |
| Comparative Example 7 | B | D | 24.39 | −0.10 | −0.18 | −0.86 | 0.10 | 0.00 |
| Comparative Example 8 | A | A | 25.35 | −0.14 | −0.23 | 0.10 | 0.06 | −0.05 |
| Comparative Example 9 | C | D | 27.73 | −0.14 | −0.41 | −0.52 | 0.06 | −0.23 |
| Comparative Example 10 | A | A | 25.15 | −0.20 | −0.18 | −0.10 | 0.00 | 0.00 |
| Example 17 | A | A | 24.73 | −0.14 | −0.36 | −0.52 | 0.06 | −0.18 |
| Example 18 | A | A | 24.81 | −0.17 | −0.41 | −0.44 | 0.03 | −0.23 |
| Example 19 | B | B | 24.88 | −0.14 | −0.34 | −0.37 | 0.06 | −0.16 |
| Example 20 | B | B | 24.90 | −0.12 | −0.30 | −0.27 | 0.08 | −0.12 |
| Example 21 | C | B | 24.99 | −0.13 | −0.38 | 0.10 | 0.07 | −0.20 |
| Reference Example 1 | — | — | 25.25 | −0.20 | −0.18 | — | — | — |

Industries Ltd.), and the results and the hues of the CB molded bodies were compared with each other. It can be said that, as ΔL* becomes negatively larger, black becomes deeper than in molded bodies for which CB, which is ordinarily used as general-purpose black, is used, and it can be said that, as Δb* becomes negatively larger, black From the results shown in Table 4, it is possible to confirm that the molded body of the present disclosure is excellent in terms of both the property of being dark black and the millimeter wave-transmitting property and, furthermore, the thermoplastic resin composition is excellent in terms of fluidity at the time of molding.

This application claims priority based on Japanese Patent Application No. 2021-109787, filed on Jul. 1, 2021, the content of which is incorporated herein by reference.

The invention claimed is:

1. A molded body for a housing that is formed from a resin composition that includes a thermoplastic resin (A) and carbon nanotubes (B), wherein the carbon nanotubes (B) satisfy all of the following (1)-(3), the molded body includes 0.10-2 parts by mass of the carbon nanotubes (B) per 100 parts by mass of the thermoplastic resin (A), and the surface resistivity of the molded body is at least $1.0 \times 10^{11} \Omega/\square$, (1) a surface oxygen concentration is 1.0-5.0 mol %, (2) in powder X-ray diffraction analysis, a diffraction peak half width of a (002) plane is 4.5° or less, and (3) a ratio (G/D ratio) of a maximum peak intensity G within a range of 1560-1600 $cm^{-1}$ to a maximum peak intensity D within a range of 1310-1350 $cm^{-1}$ in a Raman spectrum is less than 0.88.

2. The molded body for a housing according to claim 1, wherein the carbon nanotubes (B) have an average diameter of 8-20 nm.

3. The molded body for a housing according to claim 1, wherein the thermoplastic resin (A) is one selected from the group consisting of a polyethylene resin, a polypropylene resin, an acrylonitrile-butadiene-styrene copolymer resin, a polycarbonate resin, a polyamide resin and a polybutylene terephthalate resin.

4. The molded body for a housing according to claim 1, wherein a thickness is 0.5-5 mm.

5. The molded body for a housing according to claim 1 that is an in-vehicle article.

* * * * *